United States Patent [19]

Martin

[11] Patent Number: 4,709,885

[45] Date of Patent: Dec. 1, 1987

[54] PARACHUTE SYSTEM AND AIRCRAFT EJECTION SEAT INCORPORATING THE SAME

[75] Inventor: James W. Martin, Beaconsfield, England

[73] Assignee: Engineering Patents & Equipment Limited, St. Peter, Channel Islands

[21] Appl. No.: 796,100

[22] Filed: Nov. 7, 1985

[30] Foreign Application Priority Data

Nov. 22, 1984 [GB] United Kingdom ............... 8429508

[51] Int. Cl.$^4$ ............................................. B64D 25/10
[52] U.S. Cl. ............................ 244/141; 244/122 AF; 244/147; 244/149
[58] Field of Search ............... 244/141, 122, 142, 147, 244/148, 149, 139; 102/337, 340, 387

[56] References Cited

U.S. PATENT DOCUMENTS

| | | | |
|---|---|---|---|
| 1,192,480 | 7/1916 | VanMeter Jr. | 244/147 |
| 1,386,815 | 8/1921 | VanMeter, Jr. | 244/147 |
| 1,686,117 | 10/1928 | Ball | 102/337 |
| 1,891,172 | 12/1932 | Paulus | 102/337 |
| 2,442,528 | 6/1948 | Beattie | 102/340 |
| 2,957,664 | 10/1960 | Stencel | 244/147 |
| 3,026,011 | 2/1962 | Beem et al. | 244/122 AE |
| 3,478,687 | 11/1969 | Craig | 102/337 |
| 3,497,168 | 2/1970 | Finney et al. | 214/149 |
| 3,584,815 | 6/1971 | Stencel | 244/149 |
| 3,595,501 | 7/1971 | Stencel . | |
| 3,646,847 | 3/1972 | Drew . | |
| 3,726,499 | 4/1973 | Stencel | 244/141 |
| 3,862,731 | 1/1975 | McIntyre | 244/141 |
| 4,004,764 | 1/1977 | Burklund et al. | 244/141 |

FOREIGN PATENT DOCUMENTS 1077 of 1915 United Kingdom .
0509207 7/1939 United Kingdom ............... 102/337

Primary Examiner—Jeffrey V. Nase
Assistant Examiner—Lynn M. Fiorito
Attorney, Agent, or Firm—Spencer & Frank

[57] ABSTRACT

A parachute system for an airman ejected from an aircraft in an ejection seat includes at least one drouge parachute housed within a rigid hollow container. In conventional manner, the drogue parachute is connected by lines with releasable attachments on the seat, one of the lines being further connected with the main parachute so that the latter will be deployed after release of said attachments. The container is formed as a projectile mounted in a gun mounted on the ejection seat. The container has, at its end facing away from the direction in which it is fired, a closure connected with the lines and with the drogue parachute. When the container and closure are fired from the gun, and the closure is arrested abruptly by the lines, the container continues in its trajectory whilst the drogue parachute is drawn from the container and deployed by the lines. After the drogue parachute has left the container, the container is completely free from the other components and can thus separate completely from the airman and the parachute system. The inventive arrangement avoids the risk presented by conventional systems in which a drogue bullet remains connected with the system presenting a hazard to the airman.

4 Claims, 7 Drawing Figures

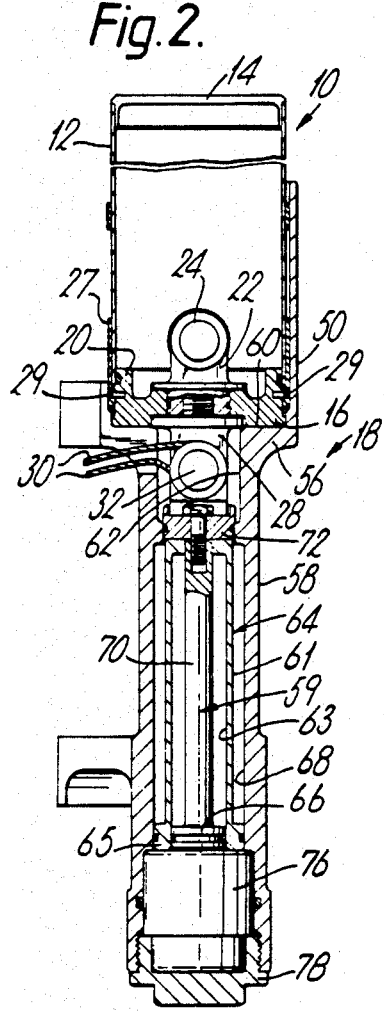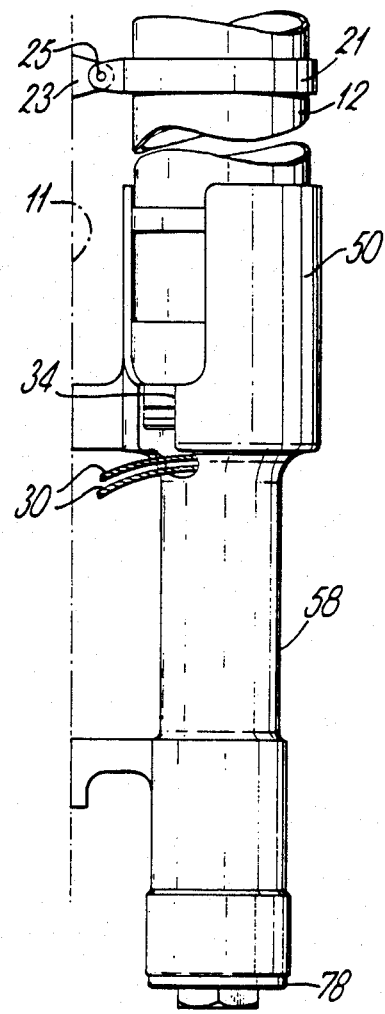

PARACHUTE SYSTEM AND AIRCRAFT EJECTION SEAT INCORPORATING THE SAME

BACKGROUND OF THE INVENTION

This invention relates to a parachute system and to an aircraft ejection seat having a parachute system associated therewith.

In operation of a typical aircraft ejection seat, the ejection seat, with an airman thereon, is ejected from an aircraft by means of a telescopic ejection gun, such ejection being assisted by a rocket motor. After ejection, a drogue parachute is deployed by means of a bullet or projectile fired from a drogue gun carried by the ejection seat, the drogue gun bullet being connected by a line to the crown of the drogue parachute in question. The drogue parachute referred to may simply be a "pilot" drogue parachute connected to a "main" drogue parachute which in turn is connected by a further line to the airman's "personal" parachute. The line interconnecting the "main" drogue parachute and the "personal" parachute in such an arrangement is normally secured to a shackle located on the seat frame, this shackle remaining locked until released by a device incorporating, for example, a timer, a barometric pressure sensing device, etc., the arrangement being such that the main drogue parachute, after deployment, remains attached to the ejection seat until the latter has slowed down to an appropriate air speed and has reached an appropriate altitude for deployment for the airman's "personal" parachute, at which point the main drogue parachute is released from the ejection seat and is allowed to draw out the airman's "personal" parachute, whilst the airman is released from the ejection seat which falls away from him.

It will be appreciated that in the conventional system described, the drogue and bullet remain attached to the drogue parachute, and thus to the airman's "personal" parachute and there is consequently some risk, albeit a small one, that at some point after it has been fired, the drogue gun bullet may strike the airman or the ejection seat, causing injury or damage.

It is an object of the present invention to provide a parachute system by means of which the above-noted risk may be avoided.

SUMMARY OF THE INVENTION

According to one aspect of the invention there is provided a parachute system for an airman ejected from an aircraft in an ejection seat, including at least one drogue parachute housed within a rigid hollow container and connected by means including a line or cord with a further parachute, said container being formed as a projectile mounted in a projection device adapted to be mounted on an ejection seat, and operable to propel the projectile from said projection device along a predetermined trajectory, said container having an end which faces in the direction opposite to that along which, in operation, the containe is moved along said trajectory by the projection device and which end, at least at a predetermined time after operation of the projection device, is open to allow the drogue parachute to be pulled from the container as the latter flies from said projection device, the arrangement being such that after projection of the rigid container from the projection device there is no positive connection between the container and any component still connected with the seat or said parachutes so that after the drogue parachute has left said container, the latter is completely free from the other components.

The invention also extends to an aircraft ejection seat incorporating such a parachute system.

An embodiment of the invention is described below by way of example with reference to the accompanying drawings.

BRIEF DESCRIPTION OF DRAWINGS

In the drawings:

FIG. 2 is a fragmentary view in axial section showing a parachute-containing projectile and a gun therefor, all forming part of a parachute system embodying the invention, and FIG. 3 is a fragmentary side elevation view (not looking in the same direction as FIG. 2) of the apparatus of FIG. 2, viewed along a line lying in the plane of FIG. 2.

DESCRIPTION OF PREFERRED EMBODIMENT

Figure 1A:
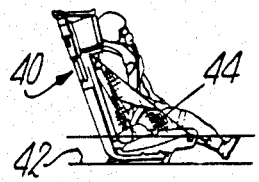
FIGS. 1a to 1e show successive stages during an ejection sequence of an ejection seat incorporating a parachute system embodying the invention.

Referring to FIG. 2, a drogue parachute 9 (see, e.g. FIG. 1e) is packed within a hollow cylindrical container 10 comprising a cylindrical tubular body 12, a cap 14 fitted sealingly to the upper end of the tubular body 12 and a closure 16 fitted sealingly to the lower end of the tubular body 12. The container 10 is fitted in a projection device in the form of a gun 18 which is secured to the rear of the ejection seat back (11, FIG. 3) adjacent the upper end thereof, the container 10 extending upwardly from the gun. The closure 16 comprises a circular plate with an upstanding peripheral rim 20 which fits closely and sealingly within the lower end of the tubular body 12. The circular plate of closure 16 has, extending upwardly from its centre, a clevis 22 between the arms of which extends transversely a pin 24 passing through a ring (not shown) connected by a cord (31, FIG. 1d) with the drogue parachute 9 packed within the container 10 or connected directly with the shrouds of the drogue parachute. The drogue parachute may be packed within the container under a partial vacuum. A similar clevis 28 extends downwardly from the middle of the closure 16, i.e. on the outer side of the closed container, and lines 30 are connected with the clevis 28 by way of a pin 32 extending transversely between the two arms of the clevis 28. The lines 30 extend from the gun 18 through a vertical slot 34 (see FIG. 3) which is open at its upper end so as to allow free passage of the ends of the lines 30 upwardly when the container is fired from the gun.

The tubular body 12 is normally held in position on the closure 16, and the container 10 including closure held in position in the gun 18, by virtue of a frangible connection between the container 10 and the seat back and which takes the form of a retaining ring 21 encircling the tubular body 12 at a position spaced above the gun 18 and secured to a bracket 23 fixed to the seat back, by means of a frangible pin 25. The lower end of the tubular body 12 is lightly secured within a sleeve 27 which is retained on closure 16, for assembly purposes, by radially projecting dowels 29.

Referring to FIG. 1, FIG. 1a shows an airman seated within an ejection seat 40 incorporating the parachute system, the seat being in its normal position in the aircraft, indicated schematically at 42. In the position shown, ejection has just been initiated and arm restraining nets 44 have been drawn around the outer sides of the airman's arms to hold these in safe positions during ejection.

Figure 1B:
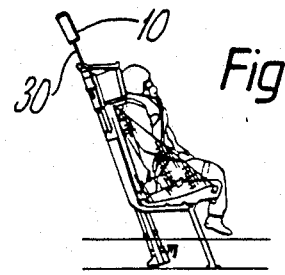
Figure 1C:
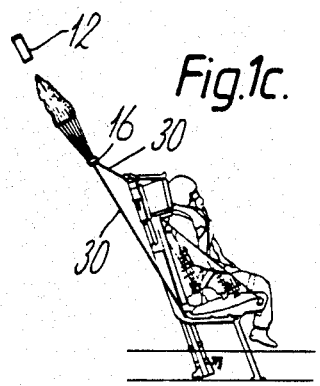
Figure 1D:
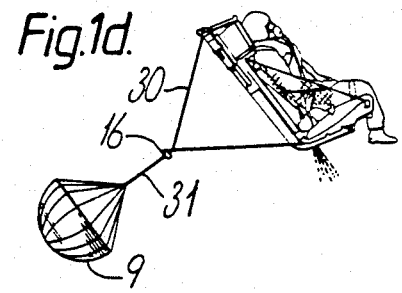
Figure 1E:
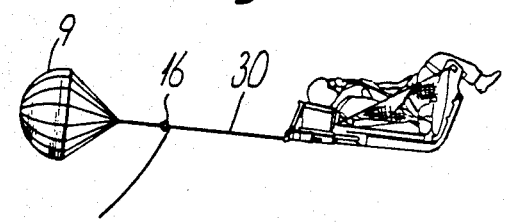

In the position shown in FIGS. 1b and 1c, the ejection seat 40 is being catapulted from the aircraft along rails by means of a gas-powered piston and cylinder arrangement. Whilst the initial ejection movement of the seat is effected by means of the piston and cylinder arrangement referred to, further acceleration of the seat/airman combination away from the aircraft, after the seat has left said rails, is effected by means of a rocket motor.

At a predetermined time during the ejection sequence, (in the example shown, at the time when the ejection seat has just reached the top of the rails referred to), the drogue parachute within the container 10 is deployed by firing the container 10 from the gun 18. Firing of container 10 from the gun fractures the frangible pin 25 allowing the container 10 to be propelled from the seat. At the limit of movement imposed by the lines 30, which at this stage are fixed to the ejection seat, the upper part of the container 10, comprising the body 12 and cap 14, and the drogue parachute within the container, are separated from the closure 16 by inertial forces as the lines 30 arrest the closure 16. The connection between container 10 and sleeve 27, and/or between sleeve 27 and the closure 16 by way of dowels 29, is sufficiently weak not to interfere with such separation. The drogue parachute is subsequently extracted from within the container body 12, as the latter continues to move under its own momentum, by the line 31 within the container which connects the drogue parachute with the clevis 22. The container body thus flies clear of the seat (FIG. 1c) whilst the drogue parachute deploys, stabilising the ejection seat (FIGS. 1d and 1e) and ultimately decelerating the seat to a safe air speed for deployment of the airman's "personal" parachute. In the sequence shown, the drogue parachute, immediately after deployment is attached to the seat by way of lines 30, attached to the top and bottom of the seat back, and subsequently the connection with the seat bottom is released whilst the connection of the remaining line 30 with the top of the seat back is retained. In this way the position of the line of action of the drogue relative to the seat is changed during the period of action of the drogue chute. Subsequently, dependent upon the air speed of the seat/pilot combination, altitude, etc., an automatic device, not forming part of the invention, releases the remaining line 30 from the seat. This line 30 extends to the airman's "personal" parachute, the securing of this line 30 to the ejection seat being effected at a point in this line 30 intermediate the clevis 28 and the airman's "personal" parachute, so that when the last line 30 is disconnected from the ejection seat, the airman's "personal" parachute is simultaneously deployed. At the same time, the airman is released from the ejection seat, which drops away from him, allowing the airman to descend safely by his "personal" parachute.

Considering FIGS. 2 and 3 in greater detail, the drogue gun 18 comprises a container-holding part 50 adapted to embrace the lower end of the container 10 in normal circumstances. The part 50 is conveniently in the form of a cylindrical tube, open at its upper end, and of an internal diameter to receive the tubular body 12 as a sliding fit, but with the lastmentioned cylindrical tube being cut away to provide clearance for the upward passage of the lines 30 attached to the clevis 28. A base wall 56 provides the lower end of the container-holding part. A coaxial part 58 of reduced diameter with respect to the container-holding part 50, extends downwardly from wall 56. The wall 56 provides, within the recess in holder 50 which receives the container, an upwardly facing abutment face 60 which engages the downwardly facing end face of the closure 16. A recess 62 extending axially within the part 58 from the end face 60 accommodates the clevis 28. The recess 62 connects with an axially extending stepped bore within the part 58 which accommodates a telescopic piston 64. The piston 64 includes an inner piston 59 and a tubular outer piston 61. The inner piston 59 has, at its lower end, a piston head 66 sealingly slidable within a bore 63 within outer piston 61 and a piston rod 70 extending upwardly from the head 66 within bore 63 and projecting through an aperture in an end wall of outer piston 61 which end wall extends across the upper end of bore 63.

The piston rod 70 terminates in a thrust member 72 which engages the lower end of the clevis 28. The outer piston 61 has at its lower end an annular piston head 65 sealingly slidable within a portion 68 of the bore in body 58 and a hollow piston rod, affording the bore 63 and extending into a reduced diameter portion of the bore in body 58, above the bore portion 68. In operation, the piston 64 is thrust upwardly by the firing of a cartridge 76 accommodated within the bore in part 58 adjacent the lower end thereof, the lower end of said bore being closed by an end plug 78 screwed into the part 58 and incorporating a firing mechanism for firing the cartridge 76. The firing mechanism within the plug 78 may operate in any desired manner, but is preferably operated by combustion gases from a pyrotechnic device (not shown), the arrangement being such that, for example, the cartridge 76 is fired at a predetermined time after ignition of the rocket motor.

I claim:

1. A parachute system for an airman ejected from an aircraft in an ejection seat, including at least one drogue parachute, a rigid hollow container housing said drogue parachute, connecting means at least temporarily connecting said drogue parachute with said ejection seat, said connecting means including line means and a closure fitted to said container, said line means including a first line connected to said drogue parachute and a second line at least temporarily connected to said ejection seat, with said closure connecting said first and second lines, said container, with said drogue parachute and with said closure, being formed as a projectile, the system including a projection device for mounting on an ejection seat, means mounting said projectile in said projection device, said projection device being operable to propel the projectile from said projection device along a predetermined trajectory, said container having a trailing end which faces in the direction opposite to that along which, in operation, the container is moved along said trajectory by the projection device and which trailing end is closed by said closure, whereby when said container is projected from the projecting device, the container remains closed, with said closure in position, until said second line becomes taut, arresting said closure whilst allowing the container and said drogue parachute to proceed along said trajectory and opening the container to allow the drogue parachute to be drawn from the container when the first line becomes taut and the momentum imparted to the container by the projection device carries the container further along said trajectory, and wherein after projection of the rigid container from the projection device there is no positive connection between the container and any component still connected with the seat or said drogue parachute so that after the drogue parachute has left said container, the container is completely free from the other components.

2. A parachute system according to claim 1 wherein said closure includes a plate fitted in an opening in said trailing end of the container, and wherein first attachment means, fixed with respect to said plate, extends from one side of said plate within the container and has said first line attached thereto, and wherein second attachment means, fixed with respect to said plate, extends from the opposite side of said plate, away from the container, and has said second line attached thereto.

3. A parachute system for an airman ejected from an aircraft in an ejection seat, including at least one drogue parachute, a rigid hollow container housing said drogue parachute, connecting means at least temporarily connecting said drogue parachute with said ejection seat, said connecting means including line means and a closure fitted to said container, said line means including a first line connecting said drogue parachute with said closure and a second line at least temporarily connecting said closure with said ejection seat, said container, with said drogue parachute and with said closure, being formed as a projectile, the system including a projection device for mounting on an ejection seat, means mounting said projectile in said projection device, said projection device being operable to propel the projectile from said projection device along a predetermined trajectory, said container having a trailing end which faces in the direction opposite to that along which, in operation, the container is moved along said trajectory by the projection device and which trailing end is closed by said closure, whereby when said container is projected from the projecting device, the container remains closed, with said closure in position, until said second line becomes taut, arresting said closure whilst allowing the container and said drogue parachute to proceed along said trajectory and opening the container to allow the drogue parachute to be drawn from the container as the container continues on said trajectory and wherein after projection of the rigid container from the projection device there is no positive connection between the container and any component still connected with the seat or said drogue parachute so that after the drogue parachute has left said container, the container is completely free from the other components,

- wherein said closure includes a plate fitted in an opening in the trailing end of the container,
- wherein first attachment means, fixed with respect to said plate, extends from one side of said plate within the container and has said first line attached thereto,
- wherein second attachment means, fixed with respect to said plate, extends from the opposite side of said plate, away from the container, and has said second line attached thereto, and
- wherein said plate of said closure is sealingly fitted to said container.

4. A parachute system according to claim 3 wherein said drogue parachute is packed under at least a partial vacuum within said container.

* * * * *